United States Patent
Can et al.

(10) Patent No.: US 12,273,621 B1
(45) Date of Patent: Apr. 8, 2025

(54) GUIDED CAMERA FOCUSING USING BARCODE IMAGES

(71) Applicant: Amazon Technologies, Inc., Seattle, WA (US)

(72) Inventors: Ali Can, Andover, MA (US); Frank Preiswerk, Brooklyn (CA)

(73) Assignee: Amazon Technologies, Inc., Seattle, WA (US)

( * ) Notice: Subject to any disclaimer, the term of this patent is extended or adjusted under 35 U.S.C. 154(b) by 199 days.

(21) Appl. No.: 18/127,403

(22) Filed: Mar. 28, 2023

(51) Int. Cl.
*H04N 23/67* (2023.01)
*G06K 7/14* (2006.01)
*G06T 7/50* (2017.01)
*G06T 7/62* (2017.01)
*G06V 10/74* (2022.01)

(52) U.S. Cl.
CPC ......... *H04N 23/675* (2023.01); *G06K 7/1443* (2013.01); *G06T 7/50* (2017.01); *G06T 7/62* (2017.01); *G06V 10/761* (2022.01)

(58) Field of Classification Search
CPC ........... H04N 23/675; G06T 7/62; G06T 7/50; G06T 7/1443; G06V 10/761
USPC .......................................................... 348/345
See application file for complete search history.

(56) References Cited

U.S. PATENT DOCUMENTS

| | | | |
|---|---|---|---|
| 10,599,902 B2* | 3/2020 | Bachelder | G06K 7/1452 |
| 11,417,001 B1* | 8/2022 | Bloch | G06T 7/521 |
| 11,657,536 B2* | 5/2023 | Wendel | G06T 7/60 |
| | | | 382/154 |
| 2008/0031514 A1* | 2/2008 | Kakinami | G06T 7/80 |
| | | | 382/154 |
| 2011/0068173 A1* | 3/2011 | Powers | G06K 7/14 |
| | | | 235/462.25 |
| 2012/0170922 A1* | 7/2012 | Shuster | G02B 7/287 |
| | | | 396/125 |
| 2013/0240628 A1* | 9/2013 | van der Merwe | G06K 7/10811 |
| | | | 235/462.24 |
| 2016/0055361 A1* | 2/2016 | Lai | G06K 7/10732 |
| | | | 235/462.06 |
| 2017/0221226 A1* | 8/2017 | Shen | G06T 7/80 |
| 2018/0139337 A1* | 5/2018 | Ghazizadeh | H04N 1/00087 |
| 2019/0108379 A1* | 4/2019 | Bachelder | G06K 7/1452 |
| 2020/0249689 A1* | 8/2020 | Tatsubori | E01F 9/00 |
| 2020/0302138 A1* | 9/2020 | Bachelder | G06K 7/1452 |
| 2021/0134012 A1* | 5/2021 | Wendel | G06T 7/60 |

(Continued)

*Primary Examiner* — Pritham D Prabhakher
(74) *Attorney, Agent, or Firm* — Kilpatrick Townsend & Stockton LLP

(57) ABSTRACT

Techniques for guiding camera focusing using barcode images are described herein. In an example, a computer system receives an image of a calibration target having a center that is aligned with an optical axis of a camera that generated the image. The calibration target includes steps that are located at different depths with respect to a lens of the camera. The calibration target includes barcode sets. Individual barcodes of a barcode set have a barcode attribute. The computer system decodes the barcode sets in the image and determines a set of decoded barcodes of the barcode sets. The computer system determines, for individual steps, a sharpness metric based on the barcode attribute of individual barcodes of the set of decoded barcodes and determines an adjustment of a focal plane of the lens based on the sharpness metric for the individual steps.

20 Claims, 7 Drawing Sheets

(56) References Cited

U.S. PATENT DOCUMENTS

2022/0366061 A1\* 11/2022 Spivack ............... H04L 9/3271
2023/0367983 A1\* 11/2023 Zagaynov ........ G06K 19/06028

\* cited by examiner

GUIDED CAMERA FOCUSING USING BARCODE IMAGES

BACKGROUND

Camera systems include lenses that focus images at a focal plane. The positioning of the lens within the camera system can affect whether images captured by the camera are in focus or out of focus. Conventionally, focusing a camera may be a tedious and inaccurate process. Accordingly, improvements to focusing lenses are desirable.

BRIEF DESCRIPTION OF THE DRAWINGS

Various embodiments in accordance with the present disclosure will be described with reference to the drawings, in which.

DETAILED DESCRIPTION

Figure 1:
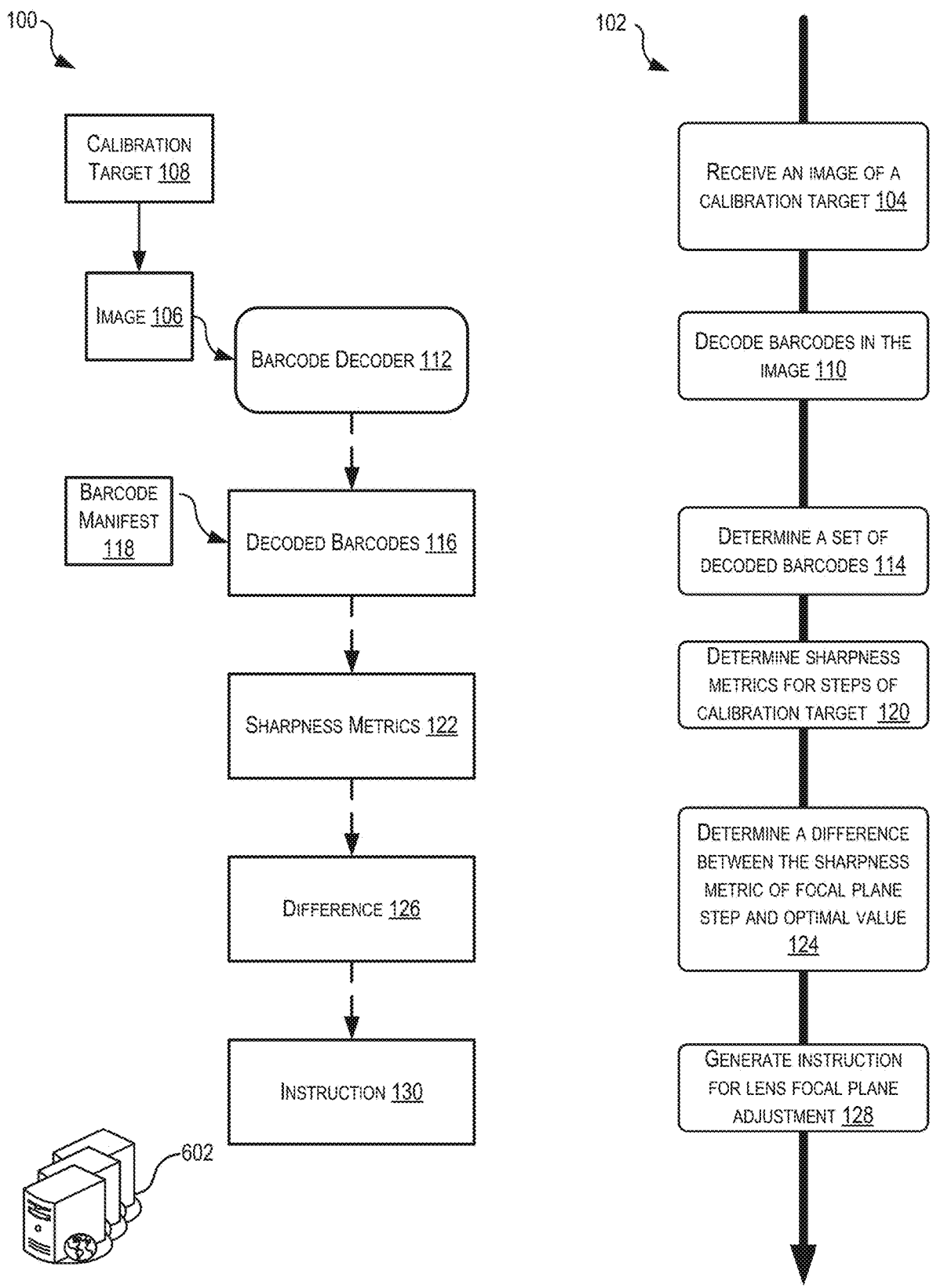
FIG. 1 illustrates an example block diagram and associated flowchart showing a process for implementing techniques relating to focusing a camera using a barcode chart image, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples described herein are directed to, among other things, various techniques for guided camera focusing using barcode images. A computing device can perform operations relating to determining sharpness metrics for a calibration target and adjusting a focus plane of a lens of camera based on the sharpness metrics. In an example, a calibration target includes steps that are located at different depths with respect to a lens of a camera that images the calibration target. Each step of the calibration target can include sets of barcodes, and each set of barcode may include barcodes of different sizes (e.g., different lengths, widths, line thicknesses, etc.). Each barcode in the set can have a different barcode attribute, which may refer to the smallest barcode line width of the barcode. In general, as the barcode attribute gets smaller and smaller, the contrast between the lines keeps dropping, and at some point, the barcode may become not decodable. The computing device can define sharpness metrics for the steps based on barcode decodability of images of the calibration target. The sharpness metrics may be fit to a parabolic function so that a difference between a sharpness metric of the step positioned at the focal plane of the lens and an extremum value of the parabolic function can be determined. The computing device can then determine an adjustment for the focal plane of the lens so that the difference may be decreased and the focusing of the lens is improved.

Conventionally, focus calibration may require a calibration target to be placed at the focus distance. An operator then adjusts camera focus to maximize image sharpness, as evaluated by eye or using an algorithmic criterion (conventionally derived directly from image contrast via structures printed on the calibration target). However, this process may be both tedious and inaccurate. Embodiments of the present disclosure make finding the optimal focus faster and easier for the operator, by guiding the operator in which direction the focus should be adjusted, and by how much. The process further makes the result more accurate compared to the conventional process. In addition, this method also does not depend on absolute sharpness metrics as these may be difficult to calculate as they depend on various factors, such as contrast, camera noise levels, illumination, uniformity, aperture, etc. The present sharpness metric is a relative sharpness metric calculated based on decodable barcodes, and hence is robust to variations.

In a particular example, a computing device, such as a webserver, a personal computing device, a tablet computer, a smartphone, or the like, can receive an image captured by a camera having a lens. The image can be an image of a radial calibration target with five steps each at a different depth with respect to the lens. A first step is at a first depth (plane 0) that aligns with the focal plane of the lens of the camera, a second step is located at a second depth (plane −1) above the first step and closer to the camera, a third step is located at a third depth (plane −2) above the second step and closer to the camera, a fourth step is located at a fourth depth (plane +1) below the first step and further from the camera, and a fifth step is located at a fifth depth (plane +2) below the fourth step and further from the camera. Each step can include six sets of six barcodes oriented around a center of the calibration target. The six barcodes in each set may have a different X dimension, representing the smallest barcode line width of the barcode. For instance, the X dimensions of the barcodes may be 4.2 mil, 5 mil, 5.9 mil, 7.1 mil, 8.3 mil, and 10 mil. The image can be processed by a barcode decoder to decode the barcodes in the image. The computing device can determine a sharpness metric of the average X dimension of the decoded barcodes for each step. For instance, the average decoded X dimension of plane −2 may be 6.5 mil, the average decoded X dimension of plane −1 may be 8 mil, the average decoded X dimension of plane 0 may be 8.5 mil, the average decoded X dimension of plane +1 may be 9.2 mil, and the average decoded X dimension of plane +2 may be 10 mil. Since it may be more desirable to decode have a smaller average decoded X dimension, the computing device can determine that the performance of plane +1 and plane +2 is worse than plane −1 and plane −2. So, the computing device can determine that the focal plane of the lens is too close to the camera. The computing device can determine that lens focusing should be adjusted such that the focal plane moves away from the camera. The computing device can generate an instruction that indicates the adjustment so that the focusing can be improved.

Turning now to the figures, FIG. 1 illustrates an example block diagram 100 and associated flowchart showing a process 102 for implementing techniques relating to determining an optical resolution from a barcode chart image, according to at least one example. The diagram 100 depicts devices, objects, and the like that correspond to the process 102. The process 102 can be performed by any suitable combination of hardware and/or software, as described herein.

Figure 4:
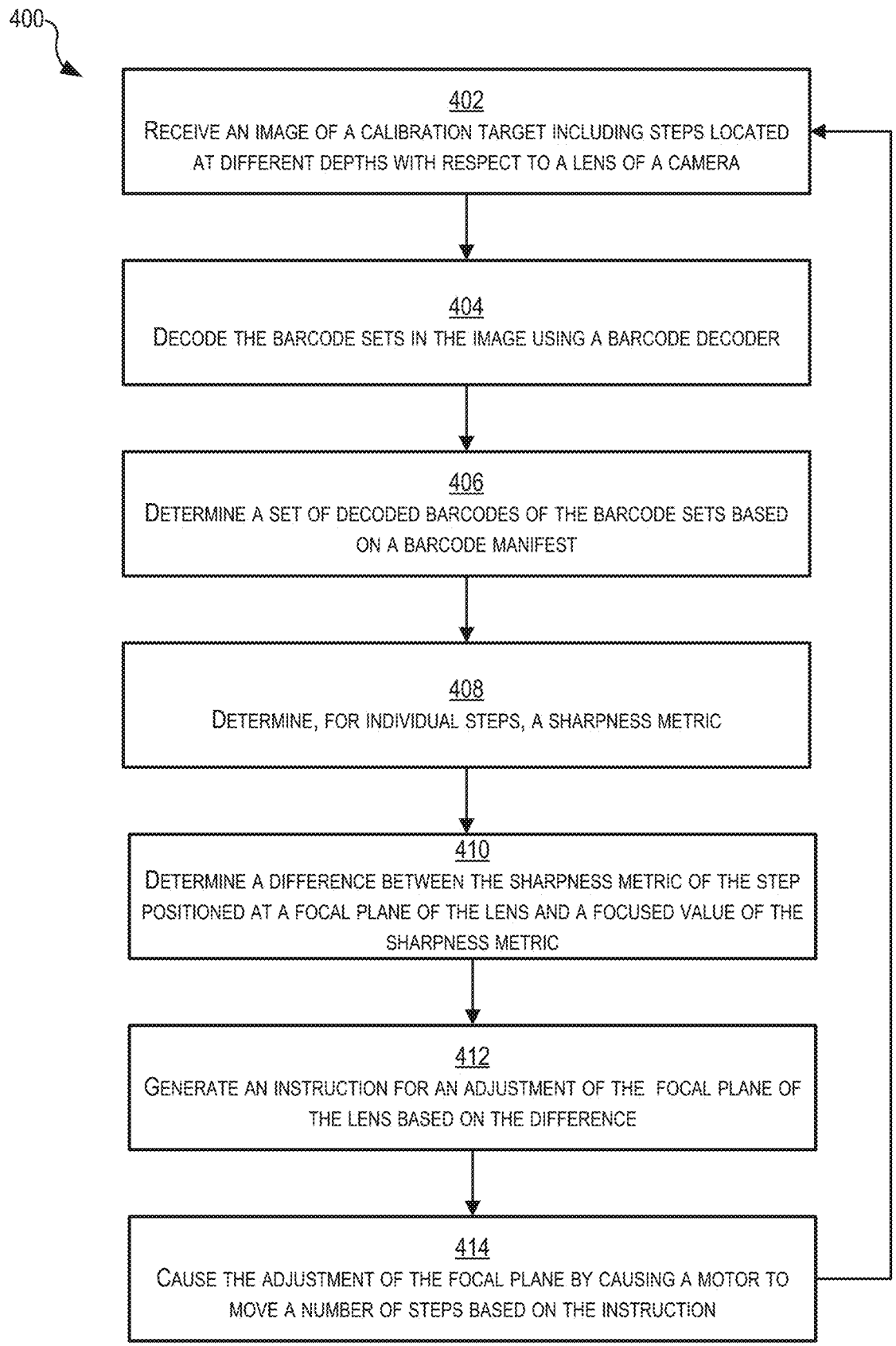
FIG. 4 illustrates an illustrates an example flowchart showing a process for implementing techniques relating to adjusting a focal plane of a lens using barcode images, according to at least one example.
Figure 5:
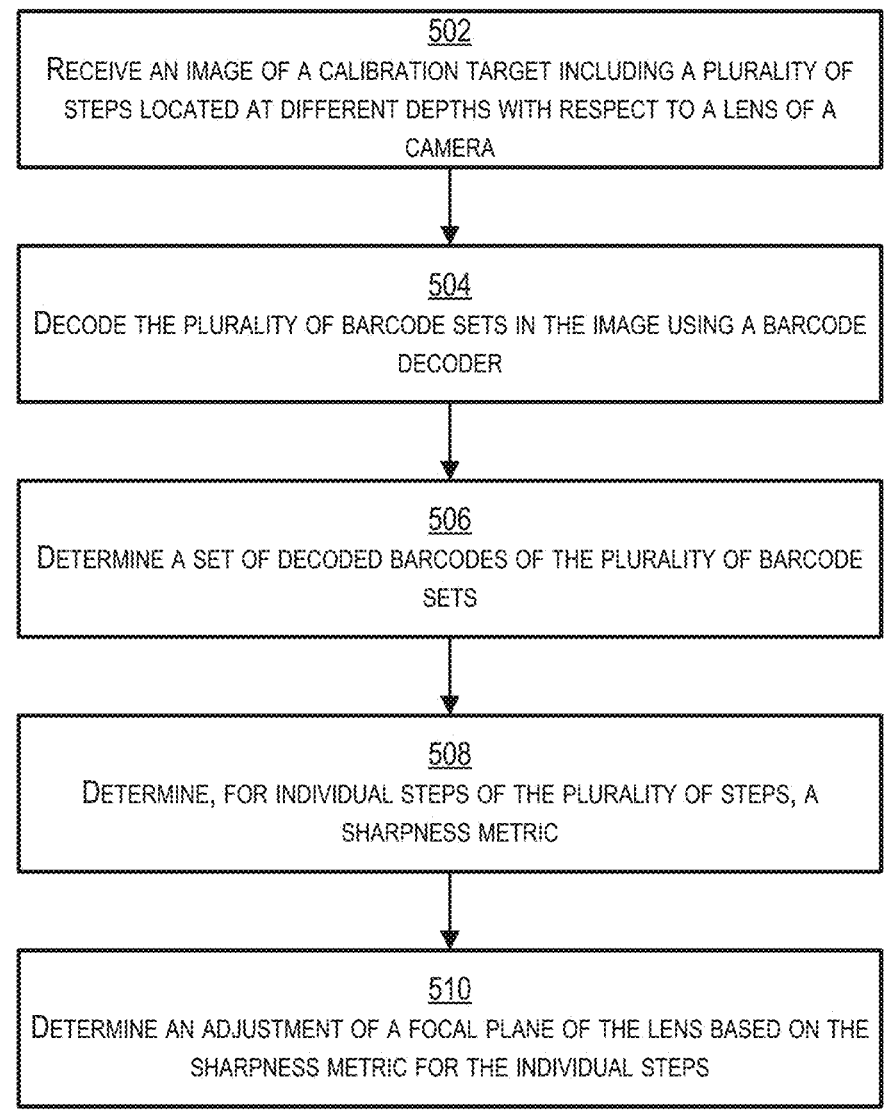
FIG. 5 illustrates an illustrates an example flowchart showing a process for implementing techniques relating to guided camera focusing using barcode images, according to at least one example.

FIGS. 1, 4, and 5 illustrate example flow diagrams showing respective processes 102, 400, and 500, as described herein. The processes 102, 400, and 500, are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

A focusing engine 610 (FIG. 6) embodied in a computer system 602 (FIG. 6) and/or within a user device 604 (FIG. 6) may perform the process 102. Thus, while the description below is from the perspective of the computer system 602, the user device 604 may also perform the process 102 or portions of the process 102.

The process 102 may begin at block 104 by the computer system 602 receiving an image 106 of a calibration target 108. The image 106 can be generated by a camera. The calibration target 108 may be a focusing fixture that can be used to determine how to adjust a focus plane of a lens of the camera. In an example, the calibration target 108 may be a circular object with a center that can align with an optical axis of the camera. A radius of the calibration target 108 may be in an XY-plane and a depth of the calibration target 108 can be along a Z-axis. In another example, the calibration target may be a square object with a center that can align with the optical axis of the camera. A perimeter of the calibration target 108 may be in the XY-plane and the depth of the calibration target 108 can be along the Z-axis. Other calibration targets may be other shapes or constructions such as triangles, pentagons, hexagons, etc. The calibration target 108 can include multiple steps that are each an equal portion of the perimeter (or radius) and are each located at a different depth along the Z-axis. For instance, if the calibration target 108 is circular, the calibration target 108 may include three steps that are each one-third of the radius. A first step may be at a first depth that aligns with the focal plane of the lens of the camera, a second step can be located at a second depth that is a distance from the first depth in a positive Z-direction, and a third step can be located at a third depth that is the same distance from the first depth, but in a negative Z-direction. If the calibration target 108 is square, the calibration target 108 may include four quadrants each at different depths.

In an example, the steps of the calibration target 108 can include barcode sets that can be used to determine how to focus the camera. The barcodes may be one-dimensional barcodes or two-dimensional barcodes. Examples of barcodes that may be in the barcode sets include universal product code (UPC) barcodes, interleaved two of five (ITF) barcodes, international article number (EAN) barcodes, quick response (QR) barcodes, etc. Each barcode has an attribute that may be different from the barcode attributes of other barcodes in the set. For instance, the barcode attribute may be an X dimension representing a width of a thinnest line in the barcode. Another example of a barcode attribute may be an average thickness of lines in the barcode. The sets of barcodes of the calibration target 108 may be arranged in various orientations around the center of the calibration target 108. For example, the barcode sets may be radially oriented towards the center of the calibration target 108, tangentially oriented with respect to the Z-axis at the center of the calibration target 108, horizontally oriented, vertically oriented, or a combination thereof.

The process 102 may continue at block 110 by the computer system 602 decoding barcodes in the image 106. The image 106 can be processed by a barcode decoder 112 to decode the barcode sets. The barcode decoder 112 can be an off-the-shelf barcode reader that scans the barcodes depicted in the image 106.

The process 102 may continue at block 114 by the computer system 602 determining decoded barcodes 116. The computer system 602 may define a barcode manifest 118 of the barcodes before the image 106 is captured, and the barcode manifest 118 can be used to determine the decoded barcodes 116. The barcode manifest 118 can include encoded information associated with the barcodes of the calibration target 108. In an example, the encoded information for a barcode can include a step identifier indicating the step that the barcode is positioned on, a size identifier indicating the barcode attribute (e.g., X dimension) of the barcode, and any other suitable information about the barcode (e.g., orientation, relative size, number in a set of barcodes, etc.). A barcode may be considered a decoded barcode if the information decoded by the barcode decoder 112 matches the encoded information for that barcode in the barcode manifest 118. Barcodes that are not decoded or are decoded as an incorrect value are not considered to be part of the decoded barcodes 116.

The process 102 may continue at block 120 by the computer system 602 determining sharpness metrics 122 for the steps of the calibration target 108. A sharpness metric may be determined for an individual step of the calibration target 108 based on the barcode attributes of the decoded barcodes 116 for the individual step. As an example, the sharpness metrics 122 may be average X dimensions for the decoded barcodes 116 for the steps, where one sharpness metric of the sharpness metrics 122 corresponds to the average X dimension for the decoded barcodes 116 for a step. As another example, the sharpness metrics 122 may be a smallest X dimension for the decoded barcodes 116 for the steps, where one sharpness metric of the sharpness metrics 122 corresponds to the smallest X dimension for the decoded barcodes 116 for a step. In addition, another example of the sharpness metrics 122 may be defined by calculating a percentage of barcode attributes (e.g., X dimensions) decoded on each step, which corresponds to a distribution of the decoded barcodes 116 associated with the barcode attribute, fitting parametric models to the distributions, and using the parameters of the parametric models as a metric for the sharpness metrics 122.

The process 102 may continue at block 124 by the computer system 602 determining a difference 126 between the sharpness metric of the step positioned at the focal plane of the lens and an optimal value for the sharpness metric. The optimal value may correspond to a focused value for the sharpness metric (e.g., the value of the sharpness metric if the lens is positioned such that no adjustment to the focal plane is needed). The optimal value may correspond to an extremum value (e.g., a maximum value or a minimum value) of a parabolic function. The parabolic function may be $y=a*(x-h)^2+k$, where the optimal value corresponds to $y=k$. So, determining the difference 126 may involve fitting the sharpness metric for the individual steps to a parabolic function to determine a difference between the sharpness metric of the step positioned at the focal plane of the lens and an extremum value of the parabolic function. For example, if the calibration target 108 includes five steps, the middle step is considered to be located at the focus plane of the lens. The step above the middle step that is close to the camera is considered to be located at relative depth −1, and the step that is two steps above the middle step is considered to be located at relative depth −2. Similarly, the steps below the middle step are considered to be at relative depths of +1 and +2. Since the middle step is the reference plane, the location of the optimal value of the fitted function also indicated how far the optimal focus is from the existing focus.

When a parametric function is used to determine where the optimal focal plane is, the underlying degrees of freedom (number of parameters) in the parametric model determines the minimum number of steps on the calibration target 108. For example, a symmetric parabola requires at least three steps to solve for the $y=a*(x-h)^2+k$. The three observations to solve for the three unknowns are (−1, Sharpness at step −1), (0, Sharpness at the middle step) and (+1, Sharpness at step +1). Alternatively, if a non-symmetric parabolic function is used, then a four-step calibration target may be used for exact fit, or a five or more step calibration target can be used for a least squares fit. When a five step calibration target is used, the parametric function may be expressed as:

$$y = f(x) = \begin{cases} a_1(x-h)^2 + k, & x < h \\ a_2(x-h)^2 + k, & x \geq h \end{cases}$$

The value of "h" estimated from the above equation indicates how far the optimal focusing is from the existing focus. When "h" is close to zero, then the lens is at the optimal value. In this parametric model, the sign of "h" indicates in which direction the lens should be adjusted to reach the optimal focusing.

In another example, the computer system may measure (h*dz/WD) to decide if the optimal value for the sharpness metric of the step positioned at the focal plane has been reached. In this metric, dz is the height between the adjacent steps of the calibration target and WD is the working distance between the camera and the middle step on the calibration target 108. This metric may be more robust across different working distances.

The process 102 may continue at block 128 by the computer system 602 generating an instruction 130 for a lens focal plane adjustment. The instruction 130 may indicate a direction of movement and an amount of movement that the lens should be adjusted so that the sharpness metric of the step located at the focal plane of the lens is the optimal value. The direction and amount of movement can be determined based on the difference 126. If the camera includes a motor coupled to the lens that can be operated to move the lens, the instruction 130 may be sent to the camera to cause the adjustment of the focal plane by modifying a position of the lens in the camera. In an example, the computer system 602 may determine a number of steps to move the motor based on the difference 126 and then cause the motor to move that number of steps to modify the position of the lens in the camera and the focal plane of the lens.

Figure 2:
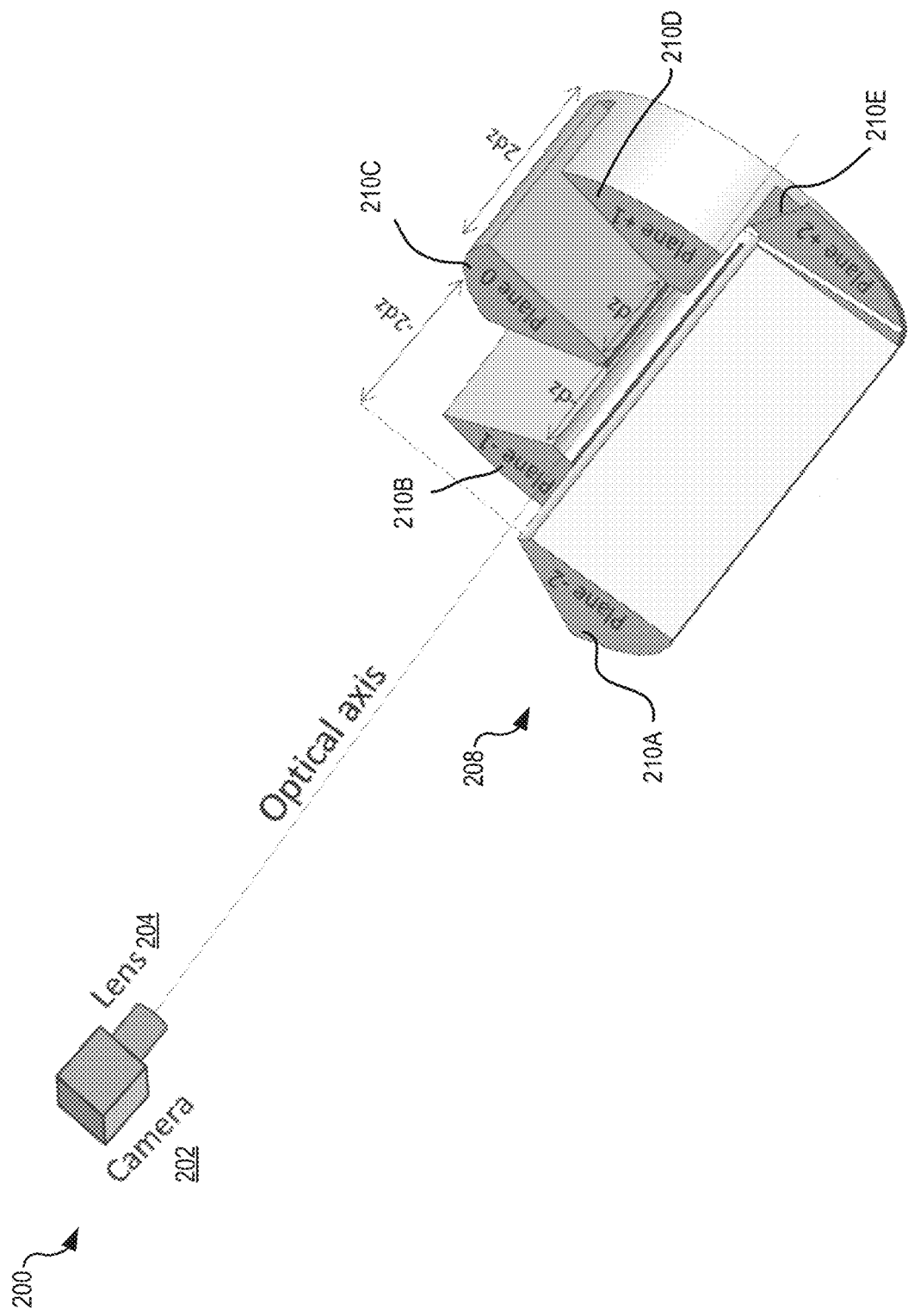
FIG. 2 illustrates an example system for guided camera focusing using barcode images, according to at least one example.

FIG. 2 illustrates an example system 200 for guided camera focusing using barcode images, according to at least one example. The system 200 includes a camera 202 with a lens 204 and a calibration target 208. A center of the calibration target 208 can be aligned with an optical axis of the camera 202. A radius of the calibration target 208 is in an XY-plane and a depth of the calibration target 208, and the optical axis, is along the Z-axis. The calibration target 208 includes multiple steps 210A-E that are each an equal portion of the radius and are each located at a different depth along the Z-axis. As illustrated, the calibration target 208 includes five steps 210A-E that are orthogonal to the optical axis of the camera 202 and are each one-fifth of the radius. A first step 210C is at a first depth (plane 0) that aligns with the focal plane of the lens 204 of the camera 202, a second step 210B is located at a second depth (plane −1) above the first step 210C and closer to the camera 202, a third step 210A is located at a third depth (plane −2) above the second step 210B and closer to the camera 202, a fourth step 210D is located at a fourth depth (plane +1) below the first step 210C and further from the camera 202, and a fifth step 210E is located at a fifth depth (plane +2) below the fourth step 210D and further from the camera 202. The distance (dz) between adjacent planes (e.g., plane −2 and plane −1, plane −1 and plane 0, plane 0 and plane +1, and plane +1 and plane +2) is equal. So, the areas of each of the steps 210A-E are equal, but the working distances are different.

Figure 3:
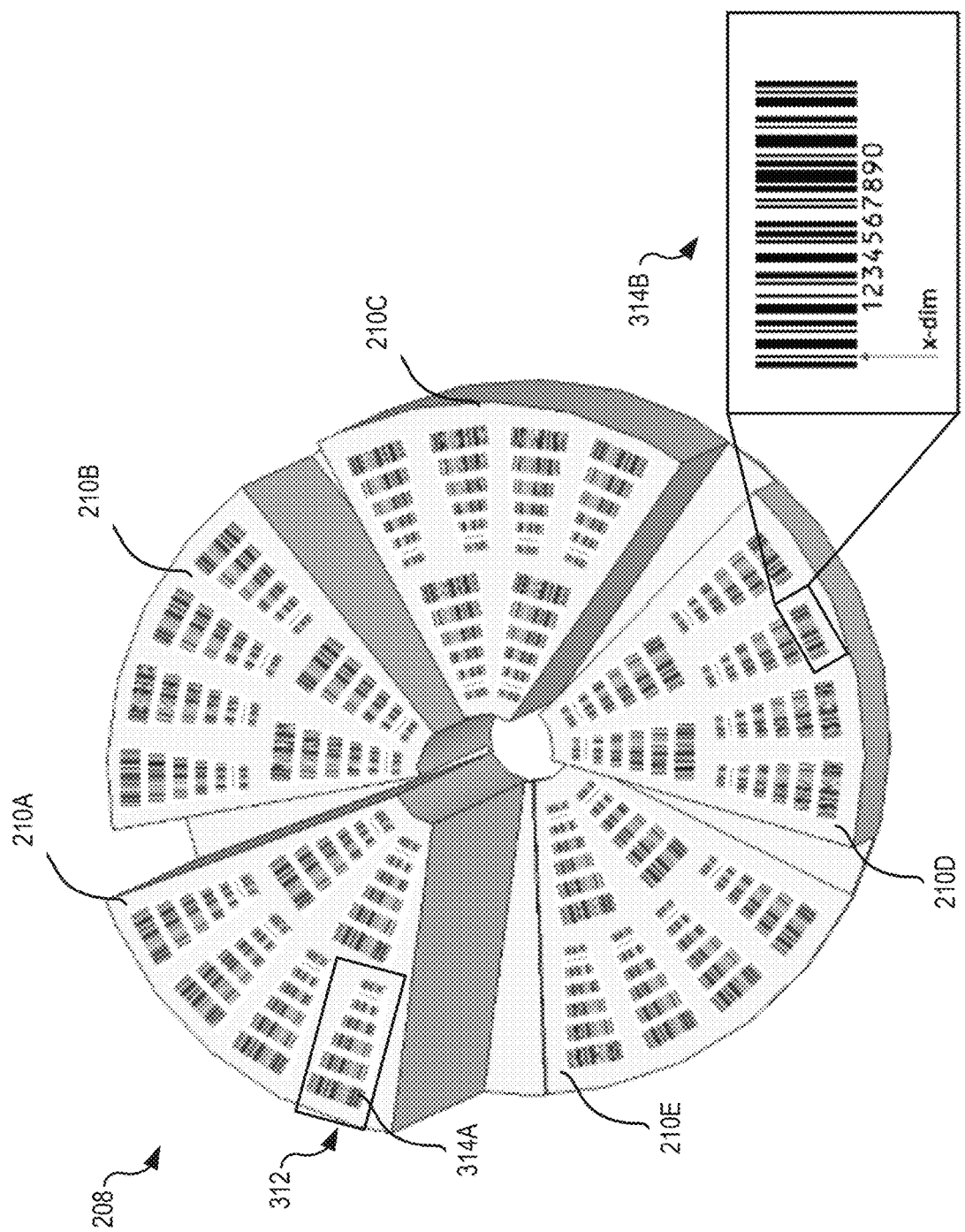
FIG. 3 illustrates an example calibration target for guided camera focusing using barcode images, according to at least one example.

FIG. 3 illustrates an example calibration target 208 for guided camera focusing using barcode images, according to at least one example. The calibration target 208 may be the calibration target shown in FIG. 2, with steps 210A-E. Each step 210A-E is illustrated as including six barcode sets 312 oriented towards a center of the calibration target 208, meaning that the barcodes 314A-B are oriented radially towards the center. The distribution of distances between the barcodes 314 and an optical axis (as shown in FIG. 2) may be the same for each step 210A-E on the calibration target 208.

Each barcode set 312 is illustrated as including six barcodes 314, and each barcode 314 has a different barcode attribute. In FIG. 3, the barcode attribute is shown as being the X dimension, which is the width of the smallest element of the barcode 314B. For example, for a one-dimensional barcode, the X dimension is the width of the thinnest line in the barcode 314. For a two-dimensional barcode, the X dimension is the width and height of the smallest 'pixel'. Either way, for both one-dimensional and two-dimensional barcodes, the X dimension defines the necessary minimal image resolution needed to successfully read the barcode. As the lines get thinner and thinner, the contrast between the black and white lines drops. The drop in the contrast is a function of resolution of the optical system, but focusing as well, as out of focus further blurs the lines. Similarly, the extent of focus may make the smaller barcodes not decodable. As the focusing is improved more and more, smaller barcodes with smaller X dimensions become decodable up to the optical limit at the optimal focus. So, decoding the barcodes 314 of the calibration target 208 can lead to a determination of sharpness metrics for the steps 210A-E, which can then be used to determine an adjustment to the lens of the camera to improve the focus of the lens and the decodability of the barcodes 314.

FIG. 4 illustrates an illustrates an example flowchart showing a process 400 for implementing techniques relating to adjusting a focal plane of a lens using barcode images, according to at least one example. The focusing engine 610 (FIG. 6) embodied in the computer system 602 (FIG. 6) and/or within the user device 604 (FIG. 6) may perform the process 102. Thus, while the description below is from the perspective of the computer system 602, the user device 604 may also perform the process 400 or portions of the process 400.

The process 400 may begin at block 402 by the computer system 602 receiving an image of a calibration target (e.g., calibration target 208 in FIGS. 2-3) including steps located at different depths with respect to a lens of a camera. One of the steps can be located at a focal plane of the lens of the camera. A center of the calibration target can be aligned with an optical axis of the camera. The steps of the calibration target can include barcode sets oriented with respect to the center of the calibration target.

The process 400 may continue at block 404 by the computer system 602 decoding the barcode sets in the image using a barcode decoder.

The process 400 may continue at block 406 by the computer system 602 determining a set of decoded barcodes of the barcode sets based on a barcode manifest. The set of decoded barcodes can include one or more barcodes that match encoded information in the barcode manifest. The encoded information can include a step identifier indicating the step that the barcode is positioned on and a size identifier indicating a barcode attribute (e.g., X dimension, average line thickness, etc.) of the barcode.

The process 400 may continue at block 408 by the computer system 602 determining, for individual steps, a sharpness metric. The sharpness metric is based on the barcode attributes of the set of decoded barcodes. For instance, the sharpness metric may be the smallest barcode attribute decoded for a step or an average barcode attribute decoded for a step. The sharpness metric corresponds to a decodability of barcode attributes at different depths, which may reflect a focus of the camera.

The process 400 may continue at block 410 by the computer system 602 determining a difference between the sharpness metric of the step positioned at the focal plane of the lens and a focused value of the sharpness metric. The computer system 602 can fit the sharpness metric for the steps to a parabolic function to determine the difference between the sharpness metric of the step positioned at the focal plane and an extremum value of the parabolic function, where the extremum value corresponds to the focused value.

The process 400 may continue at block 412 by the computer system 602 generating an instruction for an adjustment of the focal plane of the lens based on the difference. The distance and direction of the difference can indicate how the lens can be adjusted to improve the focus, so the instruction can indicate an amount and a direction that the lens should be moved within the camera so that the focal plane of the lens is modified.

The process 400 may continue at block 414 by the computer system 602 causing the adjustment of the focal plane by causing a motor to move a number of steps based on the instruction. The lens can be coupled to a motor, and the motor can be caused to move the number of steps based on the instruction. The number of steps can be determined based on the difference. The process 400 may be iterative, as indicated by the arrow that returns to block 402. So, upon determining and causing an adjustment of the focal plane, the computer system 602 may receive and process a new image of the calibration target to determine another adjustment of the focal plane.

FIG. 5 illustrates an illustrates an example flowchart showing a process 400 for implementing techniques relating to guided camera focusing using barcode images, according to at least one example. The focusing engine 610 (FIG. 6) embodied in the computer system 602 (FIG. 6) and/or within the user device 604 (FIG. 6) may perform the process 102. Thus, while the description below is from the perspective of the computer system 602, the user device 604 may also perform the process 500 or portions of the process 500.

The process 500 may begin at block 502 by the computer system 602 receiving an image 106 (FIG. 1) of a calibration target 108 (FIG. 1) including a plurality of steps 210A-E (FIG. 2) located at different depths with respect to a lens 204 (FIG. 2) of a camera 202 (FIG. 2). The calibration target 108 can have a center that is aligned with an optical axis of the camera 202 that generated the image 106. The calibration target 108 can include a plurality of barcode sets 312 (FIG. 3). Individual barcodes 314 (FIG. 3) of a barcode set 312 have a barcode attribute that is different than barcode attributes of other barcodes of the barcode set 312.

In an example, the calibration target 108 is part of a system 200 (FIG. 2) that includes the camera 202 having the lens 204 and the computer system 602. The calibration target 108 can include a perimeter in an XY-plane and a depth along a Z-axis. The plurality of steps 210A-E are each an equal portion of the perimeter of the calibration target 108. The individual steps 210A-E are located at the different depths along the Z-axis. The plurality of barcode sets 312 are oriented around the center of the calibration target 108. The plurality of barcode sets 312 may be radially oriented towards the center of the calibration target 108, tangentially oriented with respect to the Z-axis at the center of the calibration target, or a combination thereof. The individual barcodes of the plurality of barcode sets may include one-dimensional barcodes or two-dimensional barcodes. The calibration target 108 can include a first step located at a first depth that is configured to be positioned at the focal plane of the lens of the camera, a second step located at a second depth that is a distance from the first depth in a positive Z-direction, and a third step located at a third depth that is the distance from the first depth in a negative Z-direction.

The process 500 may continue at block 504 by the computer system 602 decoding the plurality of barcode sets 312 in the image 106 using a barcode decoder 112 (FIG. 1).

The process 500 may continue at block 506 by the computer system 602 determining a set of decoded barcodes 116 (FIG. 1) of the plurality of barcode sets 312. The set of decoded barcodes 116 includes one or more barcodes 314 of the plurality of barcode sets 312 that match encoded information in a barcode manifest 118 (FIG. 1). The individual barcodes 314 of the plurality of barcode sets 312 include the encoded information including: (i) a step identifier indicating the step of the plurality of steps 210A-E that the barcode 314 is positioned on, and (ii) a size identifier indicating the barcode attribute of the barcode 314. The computer system 602 can define the barcode manifest 118 including the encoded information associated with each barcode 314 of the plurality of barcode sets 312.

The process 500 may continue at block 508 by the computer system 602 determining, for individual steps 210A-E of the plurality of steps 210A-E, a sharpness metric 122 (FIG. 1). The computer system 602 determines the sharpness metric 122 based on the barcode attribute of the individual barcodes 314 of the set of decoded barcodes 116 that match the encoded information in the barcode manifest 118. The sharpness metric 122 can be an average X dimension for the set of decoded barcodes 116 for the step or a smallest X dimension for the set of decoded barcodes 116 for the step. The computer system 602 may determine the sharpness metric 122 by determining a distribution of decoded barcodes associated with the barcode attribute of the set of decoded barcodes 116 by fitting a parametric model based on the set of decoded barcodes 116 and determining the sharpness metric 122 for the step based on the distribution of the barcode attribute of the set of decoded barcodes 116.

The process 500 may continue at block 510 by the computer system 602 determining an adjustment of a focal plane of the lens 204 based on the sharpness metric 122 for the individual steps 210A-E. The computer system 602 can determine a difference 126 (FIG. 1) between the sharpness metric 122 of the step positioned at the focal plane of the lens 204 and a focused value of the sharpness metric 122. The computer system 602 can determine the adjustment by fitting the sharpness metric 122 for the individual steps 210A-E to a parabolic function to determine the difference 126 between the sharpness metric 122 of the step positioned at the focal plane of the lens 204 and an extremum value of the parabolic function and determine the adjustment of the focal plane of the lens 204 based on the difference 126. The computer system 602 may determine the adjustment based on the difference 126, a working distance between the lens 204 and the calibration target 108, and a height between adjacent steps of the plurality of steps 210A-E of the calibration target 108.

In an example, the computer system 602 can generate an instruction 130 (FIG. 1) for the adjustment of the focal plane of the lens 204 based on the sharpness metric 122. The computer system 602 can cause the adjustment of the focal plane of the lens 204 for the camera 202 by modifying a position of the lens 204 in the camera 202 based on the instruction 130. The camera 202 can include a motor coupled to the lens 204. The motor can be configured to cause the adjustment of the focal plane based on the instruction 130. Causing the adjustment can involve determining a number of steps to move the motor coupled to the lens 204. The number of steps can be based on the difference 126 between the sharpness metric 122 of the step positioned the focal plane of the lens 204 and the focused value of the sharpness metric 122. The computer system 602 can cause the motor to move the number of steps to modify the position of the lens 204 in the camera 202 and the focal plane of the lens 204.

Figure 6:
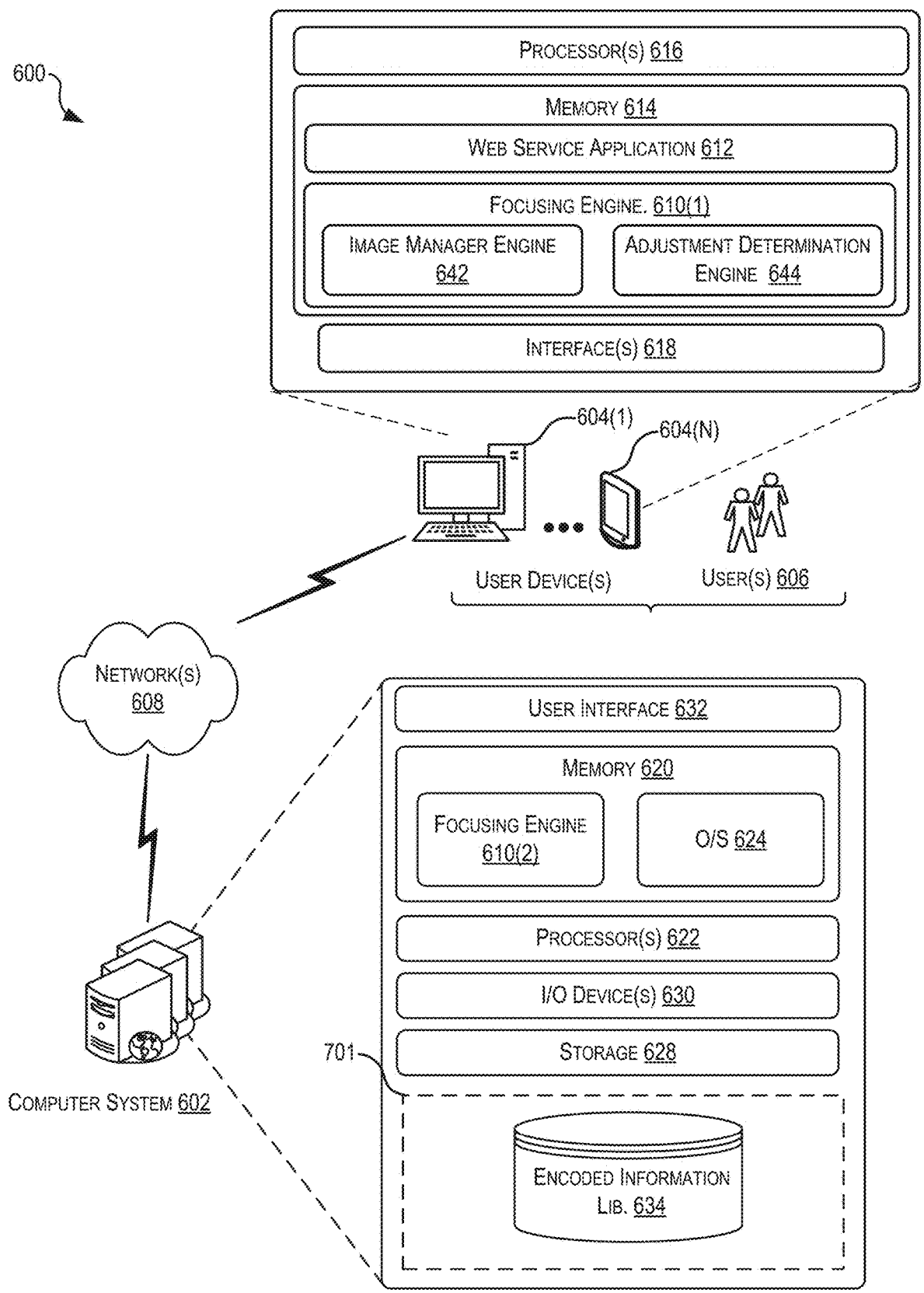
FIG. 6 illustrates an example schematic architecture for implementing techniques relating to guided camera focusing using barcode images, according to at least one example.

FIG. 6 illustrates an example schematic architecture 600 for implementing techniques relating to guided camera focusing using barcode images, according to at least one example. The architecture 600 may include a computer system 602 (e.g., the computer system described herein) in communication with one or more user devices 604(1)-604(N) via one or more networks 608 (hereinafter, "the network 608").

The user device 604 may be operable by one or more users 606 to interact with the computer system 602. The users 606 may be administrators, developers, or others that desire to test or utilize operations of the techniques described herein. The user device 604 may be any suitable type of computing device such as, but not limited to, a tablet, a mobile phone, a smart phone, a network-enabled streaming device (a high-definition multimedia interface ("HDMI") micro-console pluggable device), a personal digital assistant ("PDA"), a laptop computer, a desktop computer, a thin-client device, a tablet computer, etc. For example, the user device 604(1) is illustrated as a desktop computer, while the user device 604(N) is illustrated as an example of a handheld mobile device.

The user device 604 may include a memory 614 and processor(s) 616. In the memory 614 may be stored program instructions that are loadable and executable on the processor(s) 616, as well as data generated during the execution of these programs. Depending on the configuration and type of user device 604, the memory 614 may be volatile (such as random access memory ("RAM")) and/or non-volatile (such as read-only memory (ROM), flash memory, etc.).

In some examples, the memory 614 may include a web service application 612 and a version of a focusing engine 610 (e.g., 610(1)). The web service application 612 and/or the focusing engine 610(1) may allow the user 606 to interact with the computer system 602 via the network 608. The user device 604 may also include one or more interfaces 618 to enable communication with other devices, systems, and the like. The focusing engine 610, whether embodied in the user device 604 or the computer system 602, may be configured to perform the techniques described herein.

The focusing engine 610 includes an image manager engine 642 and an adjustment determination engine 644. In an example, the focusing engine 610 can include any other suitable engines, modules, models, and the like.

The image manager engine 642 can manage various tasks related to the generating and processing an image of a calibration target. In an example, the image manager engine 642 may generate an image, may ingest an image, may input an image into a barcode decoder, may determine decoded barcodes based on a barcode manifest, and any other suitable tasks with respect to the images described herein.

The adjustment determination engine 644 can include one or more computer services for determining an adjustment for a lens of a camera based on information generated by the image manager engine 642. In an example, the adjustment determination engine 644 may include a one or more parametric functions. The adjustment determination engine 644 may ingest decoded barcodes, may determine sharpness metrics for steps of the calibration target, may apply the parametric functions to determine a difference from a focused value, may generate an instruction for an adjustment of the lens based on the difference, may transmit or otherwise share the instruction, and any other suitable tasks.

Turning now to the details of the computer system 602, the computer system 602 may include one or more computer system computers, perhaps arranged in a cluster of servers or as a server farm, and may host web service applications. The function of the computer system 602 may be implemented a cloud-based environment such that individual components of the computer system 602 are virtual resources in a distributed environment.

The computer system 602 may include at least one memory 620 and one or more processing units (or processor(s)) 622. The processor 622 may be implemented as appropriate in hardware, computer-executable instructions, software, firmware, or combinations thereof. Computer-executable instruction, software, or firmware implementations of the processor 622 may include computer-executable or machine-executable instructions written in any suitable programming language to perform the various functions described. The memory 620 may include more than one memory and may be distributed throughout the computer system 602. The memory 620 may store program instructions that are loadable and executable on the processor(s) 622, as well as data generated during the execution of these programs. Depending on the configuration and type of memory including the computer system 602, the memory 620 may be volatile (such as RAM and/or non-volatile (such as read-only memory ("ROM"), flash memory, or other memory)). The memory 620 may include an operating system 624 and one or more application programs, modules, or services for implementing the features disclosed herein including at least a version of the focusing engine 610 (e.g., 610(2)). For example, the focusing engine 610(2) may perform the functionality described herein.

The computer system 602 may also include additional storage 628, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 628, both removable and non-removable, is an example of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components may refer to programming modules executed by computing systems (e.g., processors) that are part of the computer system 602 and/or part of the user device 604.

The computer system 602 may also include input/output (I/O) device(s) and/or ports 630, such as for enabling connection with a keyboard, a mouse, a pen, a voice input device, a touch input device, a display, speakers, a printer, or other I/O device.

In some examples, the computer system 602 may also include one or more user interface(s) 632. The user interface 632 may be utilized by an operator, curator, or other authorized user to access portions of the computer system 602. In some examples, the user interface 632 may include a graphical user interface, voice interfaces, web-based applications, programmatic interfaces such as APIs, or other user interface configurations.

The computer system 602 may also include a data store 601. In some examples, the data store 601 may include one or more databases, data structures, or the like for storing and/or retaining information associated with the computer system 602 and which, in some examples, may be accessible by the user devices 604. The focusing engine 610 is communicatively coupled (e.g., via a wired connection or a wireless connection) to the data store 601. The data store 601 includes an encoded information library 634 for one or more barcode manifests. In an example, the data store 601 can include any other suitable data, databases, libraries, and the like.

Figure 7:
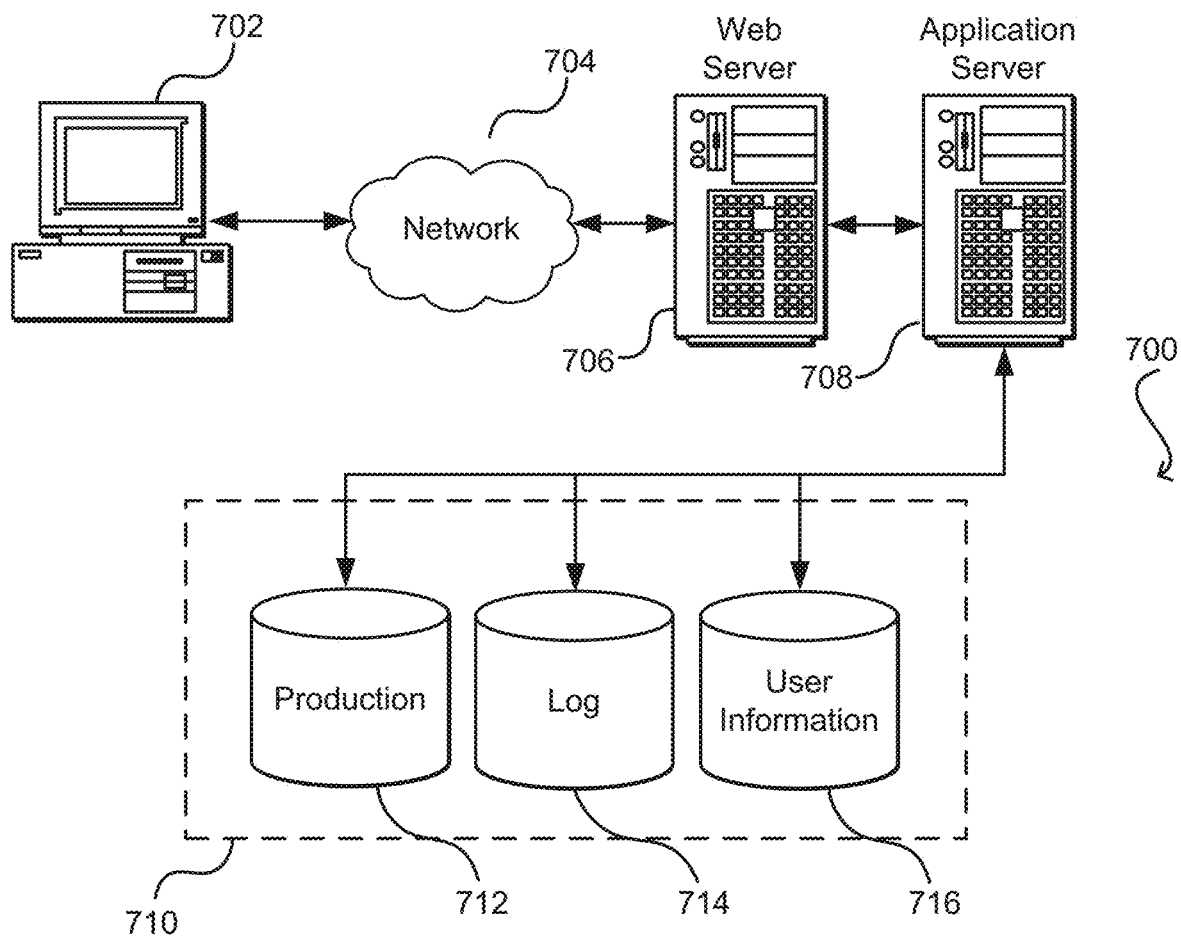
FIG. 7 illustrates an environment in which various embodiments can be implemented.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method comprising:
    generating, by a camera having a lens, an image of a calibration target having a center that is aligned with an optical axis of the camera, wherein the calibration target includes a plurality of steps that are an equal portion of a radius of the calibration target, wherein individual steps of the plurality of steps are located at different depths with respect to the lens of the camera and comprise a plurality of barcode sets oriented towards the center, and wherein individual barcodes of a barcode set have a barcode attribute that is different than barcode attributes of other barcodes of the barcode set;
    decoding the plurality of barcode sets in the image using a barcode decoder;
    determining a set of decoded barcodes of the plurality of barcode sets, wherein the set of decoded barcodes includes one or more barcodes of the plurality of barcode sets that match encoded information in a barcode manifest;
    determining, for the individual steps of the plurality of steps, a sharpness metric based on the barcode attribute of individual barcodes of the set of decoded barcodes that match the encoded information in the barcode manifest;
    determining a difference between the sharpness metric of the step positioned at a focal plane of the lens and a focused value of the sharpness metric; and
    generating an instruction for an adjustment of the focal plane of the lens based on the difference.

2. The method of claim 1, wherein the calibration target comprises:
    a first step located at a first depth that is configured to be positioned at the focal plane of the lens of the camera;
    a second step located at a second depth that is a distance from the first depth in a positive Z-direction; and
    a third step located at a third depth that is the distance from the first depth in a negative Z-direction.

3. The method of claim 1, further comprising:
    causing the adjustment of the focal plane of the lens for the camera by modifying a position of the lens in the camera based on the instruction.

4. The method of claim 3, wherein causing the adjustment comprises:
   determining a number of steps to move a motor coupled to the lens, wherein the number of steps is based on the difference between the sharpness metric of the step positioned the focal plane of the lens and the focused value of the sharpness metric; and
   causing the motor to move the number of steps to modify the position of the lens in the camera and the focal plane of the lens.

5. A system, comprising:
   a calibration target for use with a camera, comprising:
   a perimeter defined in an XY-plane;
   a depth along a Z-axis; and
   a plurality of steps that are each an equal portion of the perimeter of the calibration target, wherein individual steps of the plurality of steps are located at different depths along the Z-axis, wherein the individual steps comprise a plurality of barcode sets oriented around a center of the calibration target, and wherein individual barcodes of a barcode set have a barcode attribute that is different than barcode attributes of other barcodes of the barcode set.

6. The system of claim 5, wherein the plurality of steps comprises:
   a first step located at a first depth along the Z-axis that is configured to be positioned at a focal plane of a lens of the camera;
   a second step located at a second depth along the Z-axis that is a distance from the first depth in a positive Z-direction; and
   a third step located at a third depth along the Z-axis that is the distance from the first depth in a negative Z-direction.

7. The system of claim 5, wherein the plurality of barcode sets are radially oriented towards the center of the calibration target.

8. The system of claim 5, wherein the plurality of barcode sets are tangentially oriented with respect to the Z-axis at the center of the calibration target.

9. The system of claim 5, wherein individual barcodes of the plurality of barcode sets include encoded information including: (i) a step identifier indicating the step of the plurality of steps that the barcode is positioned on, and (ii) a size identifier indicating the barcode attribute of the barcode.

10. The system of claim 5, further comprising:
    the camera having a lens, wherein an optical axis of the camera is configured to be aligned with the center of the calibration target; and
    a computer system comprising:
    one or more processors; and
    one or more memory storing instructions that, upon execution by the one or more processors, configure the system to:
    receive, from the camera, an image of the calibration target;
    decode the plurality of barcode sets in the image using a barcode decoder;
    determine a set of decoded barcodes of the plurality of barcode sets, wherein the set of decoded barcodes includes one or more barcodes of the plurality of barcode sets that match encoded information in a barcode manifest;
    determine, for individual steps of the plurality of steps, a sharpness metric based on the barcode attribute of the individual barcodes of the set of decoded barcodes that match the encoded information in the barcode manifest; and
    generate an instruction for an adjustment of a focal plane of the lens based on the sharpness metric for the individual steps.

11. The system of claim 10, wherein the sharpness metric comprises an average X dimension for the set of decoded barcodes for the step.

12. The system of claim 10, wherein the sharpness metric comprises a smallest X dimension for the set of decoded barcodes for the step.

13. The system of claim 10, wherein the camera further comprises a motor coupled to the lens, wherein the motor is configured to cause the adjustment of the focal plane based on the instruction.

14. One or more non-transitory computer-readable storage media storing instructions that, upon execution by a system, cause the system to perform operations comprising:
    receiving an image of a calibration target having a center that is aligned with an optical axis of a camera that generated the image, wherein the calibration target includes a plurality of steps that are located at different depths with respect to a lens of the camera and comprises a plurality of barcode sets, and wherein individual barcodes of a barcode set have a barcode attribute that is different than barcode attributes of other barcodes of the barcode set;
    decoding the plurality of barcode sets in the image using a barcode decoder;
    determining a set of decoded barcodes of the plurality of barcode sets, wherein the set of decoded barcodes includes one or more barcodes of the plurality of barcode sets that match encoded information in a barcode manifest;
    determining, for individual steps of the plurality of steps, a sharpness metric based on the barcode attribute of individual barcodes of the set of decoded barcodes that match the encoded information in the barcode manifest; and
    determining an adjustment of a focal plane of the lens based on the sharpness metric for the individual steps.

15. The one or more non-transitory computer-readable storage media of claim 14 storing further instructions that, upon execution by the system, cause the system to determine the adjustment of the focal plane by:
    fitting the sharpness metric for the individual steps to a parabolic function to determine a difference between the sharpness metric of the step positioned at the focal plane of the lens and an extremum value of the parabolic function; and
    determining the adjustment of the focal plane of the lens based on the difference.

16. The one or more non-transitory computer-readable storage media of claim 15 storing further instructions that, upon execution by the system, cause the system to perform operations comprising:
    determining the adjustment based on the difference, a working distance between the lens and the calibration target, and a height between adjacent steps of the plurality of steps of the calibration target.

17. The one or more non-transitory computer-readable storage media of claim 14 storing further instructions that, upon execution by the system, cause the system to determine the sharpness metric for each step by:

determining a distribution of decoded barcodes associated with the barcode attribute of the set of decoded barcodes by fitting a parametric model based on the set of decoded barcodes; and determining the sharpness metric for the step based on the distribution of the barcode attribute of the set of decoded barcodes.

18. The one or more non-transitory computer-readable storage media of claim 14 storing further instructions that, upon execution by the system, cause the system to perform operations comprising:

defining the barcode manifest comprising the encoded information associated with each barcode of the plurality of barcode sets.

19. The one or more non-transitory computer-readable storage media of claim 14, wherein the individual barcodes of the plurality of barcode sets include the encoded information including: (i) a step identifier indicating the step of the plurality of steps that the barcode is positioned on, and (ii) a size identifier indicating the barcode attribute of the barcode.

20. The one or more non-transitory computer-readable storage media of claim 14, wherein the individual barcodes of the plurality of barcode sets comprise one-dimensional barcodes or two-dimensional barcodes, wherein the calibration target comprises a radius in an XY-plane and a depth along a Z-axis, wherein the individual steps are located at the different depths in the Z-axis, and wherein the plurality of barcode sets are radially oriented towards the center of the calibration target, tangentially oriented with respect to the optical axis along the Z-axis, or a combination thereof.

\* \* \* \* \*